D. FERGUSON.
HOSE COUPLING.
APPLICATION FILED MAY 5, 1919.
1,324,654.
Patented Dec. 9, 1919.
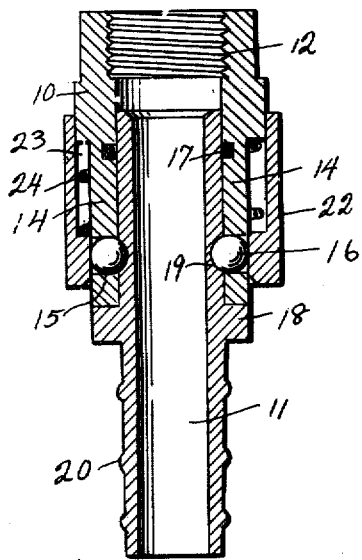
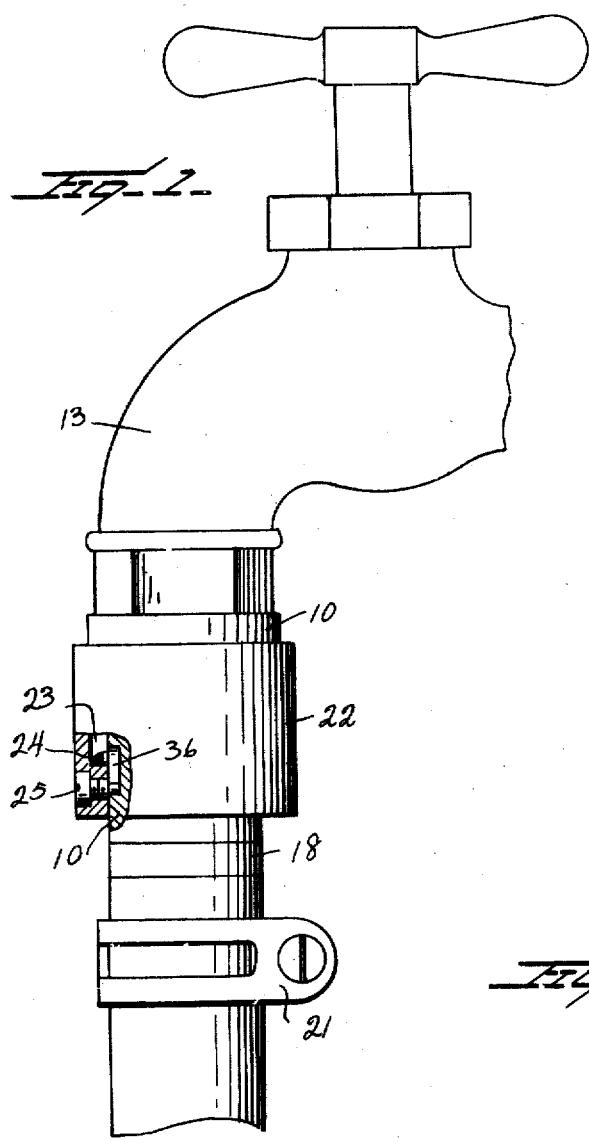
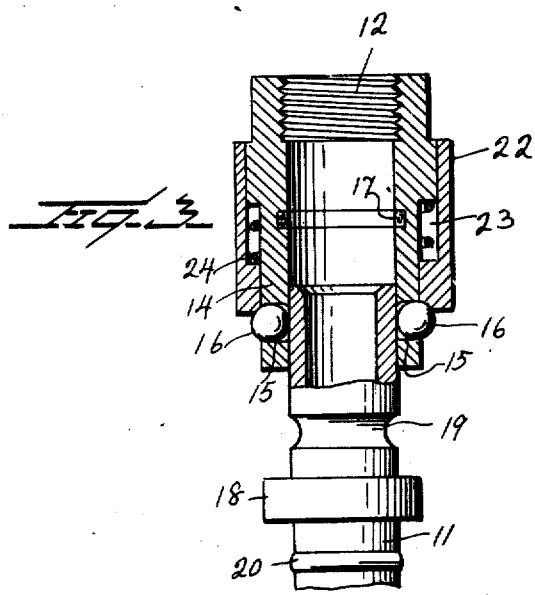
Inventor
D. Ferguson
By Watson E. Coleman
Attorney

UNITED STATES PATENT OFFICE.

DAVID FERGUSON, OF ERIE, PENNSYLVANIA, ASSIGNOR OF ONE-THIRD TO JOSEPH J. SCHEIWER AND ONE-THIRD TO ALBERT T. SCHEIWER, BOTH OF ERIE, PENNSYLVANIA.

HOSE-COUPLING.

1,324,654.    Specification of Letters Patent.    Patented Dec. 9, 1919.

Application filed May 5, 1919. Serial No. 294,682.

*To all whom it may concern:*

Be it known that I, DAVID FERGUSON, a citizen of the United States, residing at Erie, in the county of Erie and State of Pennsylvania, have invented certain new and useful Improvements in Hose-Couplings, of which the following is a specification, reference being had to the accompanying drawings.

This invention relates to couplings, and particularly to a coupling for quickly connecting a flexible hose to a pipe.

The general object of this invention is to provide means whereby the hose pipe may be readily coupled or uncoupled from a supply pipe, and in this connection to provide a construction of this kind whereby a male member carried by the hose may be readily inserted in and coupled to the female member carried by the supply pipe.

A further object is to provide improved means for locking the male and female members in engagement with each other, and means preventing the accidental detachment of the male and female members.

A further object is to provide a construction of this character in which the male member may be inserted within the female member of the coupling without the necessity of carefully adjusting the parts to this end.

Other objects will appear in the course of the following description.

My invention is illustrated in the accompanying drawings, wherein:—

Figure 1 is a side elevation of a faucet and a portion of a rubber hose with my coupling applied thereto, the coupling being partly broken away;

Fig. 2 is a vertical sectional view of the coupling showing the parts locked; and Fig. 3 is a vertical sectional view of the coupling showing the parts partially detached.

Referring to these drawings, it will be seen that I provide a female member 10 and a male member 11. The female member is annular in cross section and is interiorly screw-threaded at one end, as at 12, for engagement with a supply pipe as, for instance, for engagement with a faucet 13. The female member is reduced in cross section, at 14, and is formed with a plurality of radially extending apertures forming sockets 15 for the reception of a plurality of locking balls 16 forming dogs. These sockets are open at their inner ends so that the dogs may project inward beyond the inner surface of the female member when the parts of the coupling are locked together. Above the sockets 15, the inner face of the female member is annularly channeled for the reception of a packing 17.

The male member 11 is formed with an annular shoulder 18 intermediate its length, and above this shoulder it has an exterior diameter equal to the interior diameter of the female member so that it may be inserted therein until the shoulder abuts against the end of the female member. The reduced portion of the member 11 is formed with an annular channel 19 which receives the balls 16 when the male member is fully inserted in the female member, as illustrated in Fig. 2. Below this shoulder 18, the male member is slightly tapered and formed with a plurality of ribs or corrugations 20, whereby a flexible hose may be slipped over the male member and engaged therewith, as, for instance, by means of a clamp 21 or a wrapping of wire.

Disposed exteriorly of the member 10 is a sleeve 22 which, at one end, has an interior diameter equal to the exterior diameter of the reduced portion of the member 10 and which, at its other end, has an interior diameter equal to the exterior diameter of the unreduced portion of the member 10. Thus, this sleeve 22 may slide upon the member 10, and a chamber 23 is formed between the member 10 and the member 22, within which is disposed a coiled expansion spring 24 which, at one end, bears against the upper end of the chamber and which, at its other end, bears against the lower end of the sleeve 22 and urges this sleeve downward. Now when the locking balls or dogs 16 are forced inward into the annular channel 19, they will be beneath the surface of the reduced portion of member 10 so that the sleeve 22 may be disposed over these balls and hold them from any outward movement which would unlock the members 10 and 11.

The sleeve 22 is held in position upon the female member 10, but permitted to have a sliding, longitudinal movement by means of a screw 25 which passes through the lower end of the sleeve and into a longitudinally extending slot 36 formed in the female member, as illustrated clearly in Fig.

1. It will thus be evident that the sleeve 22 may be shifted away from member 11 and when it is so shifted, the locking balls or dogs 16 will roll outwardly in the socket 15 so as to escape from the channel 19, and that then the male member may be removed from the female member, and that reversely when the male member is inserted in the female member, assuming that the sleeve 22 is raised, it will force the ball 16 outward. Then as soon as the sleeve is released, the spring 24 will force the sleeve downward and this will force the locking balls or dogs into engagement with the shaft 19, locking the male and female members in engagement with each other, but permitting free rotation of the male member within the female member, but preventing longitudinal movement. The packing 17, will, of course, act to hold the pressure and prevent any leakage of liquid or fluid through the joint between the male and female members.

It will be seen that I have provided a very simple, and effective coupling for the purpose described, which will permit relative axial rotation of the male and female members without permitting longitudinal movement of detachment. It will be obvious also that the parts of the coupling may be readily connected or disconnected and that the device is very simple and has but two parts. By the provision of balls 16 as dogs the axial rotation of the two members with relation to each other may be readily secured. My coupling permits the ready insertion of the coupling member 11 into the coupling 10 without the necessity of accurately positioning the parts with relation to each other. This is of importance where quick coupling is desired.

While I have illustrated an embodiment of my invention which is particularly effective for the purpose described, it is obvious that many minor changes might be made in the details of construction without departing from the spirit of the invention.

I claim:—

1. A coupling comprising a male and a female member, the female member having sockets, radially movable dogs disposed in said sockets and adapted to engage with the male member, longitudinally movable means mounted on the female member in one position holding said dogs projected through the sockets into engagement with the male member and in another position permitting the outward movement of the dogs and freeing the male member, and means permitting limited, longitudinal movement of said dog engaging means but preventing rotative movement thereof.

2. A coupling of the character described comprising a female member having a plurality of radially extending sockets, balls disposed in said sockets, a male member having an annular channel into which said balls are adapted to engage, a sleeve longitudinally slidable upon the female member adapted to force said balls inward, but shiftable to a position to release the balls and permit their outward movement, means preventing the rotation of the sleeve on the female member but permitting limited, longitudinal movement thereof, and a spring urging the sleeve into position to force the balls inward, and a spring urging the spring over the balls.

3. A coupling of the character described comprising a female member having a plurality of radially disposed sockets opening upon the inside and outside of the female member, a male member insertible into the female member and having an annular channel, balls disposed in said sockets and when forced inward adapted to engage in said channel, a sleeve longitudinally movable upon the female member and adapted to engage over the balls to force the balls inward but slidable longitudinally on the female member to permit the outward movement of the balls, a spring mounted between the sleeve and the female member urging said sleeve into position to force the balls inward, and means for limiting the longitudinal movement of the sleeve and preventing rotative movement thereof.

4. A coupling of the character described comprising male and female members, one insertible into the other, and longitudinally slidable means for detachably locking the male member within the female member but permitting the relative rotation of the male and female members.

5. A coupling of the character described comprising a female member having a plurality of radially disposed, open-ended sockets adjacent one end, balls disposed in said sockets, a male member having a shoulder intermediate its ends and insertible into the first named member and having an annular chamber adapted to register with said sockets and receive said balls, a packing carried by one of said members and adapted to engage the other member, a longitudinally shiftable sleeve mounted on the female member and adapted, when disposed in one position, to force the balls inward into engagement with the channel, and in another position to allow the outward movement of the balls, a spring disposed between the sleeve and the female member and urging the sleeve into position to cover said balls, and means for limiting the longitudinal movement of the sleeve.

In testimony whereof I hereunto affix my signature in the presence of two witnesses.

DAVID FERGUSON.

Witnesses:
GEORGE J. MEAD,
J. C. NELSON.